3,213,908
WORK HOLD-DOWN FOR POWER-OPERATED PANEL SAW
Ewald Schutz, Lancaster, and Harold C. Cassey, Landisville, Pa., assignors, by mesne assignments, to The Black and Decker Manufacturing Company, Towson, Md., a corporation of Maryland
Filed June 5, 1963, Ser. No. 285,670
1 Claim. (Cl. 143—47)

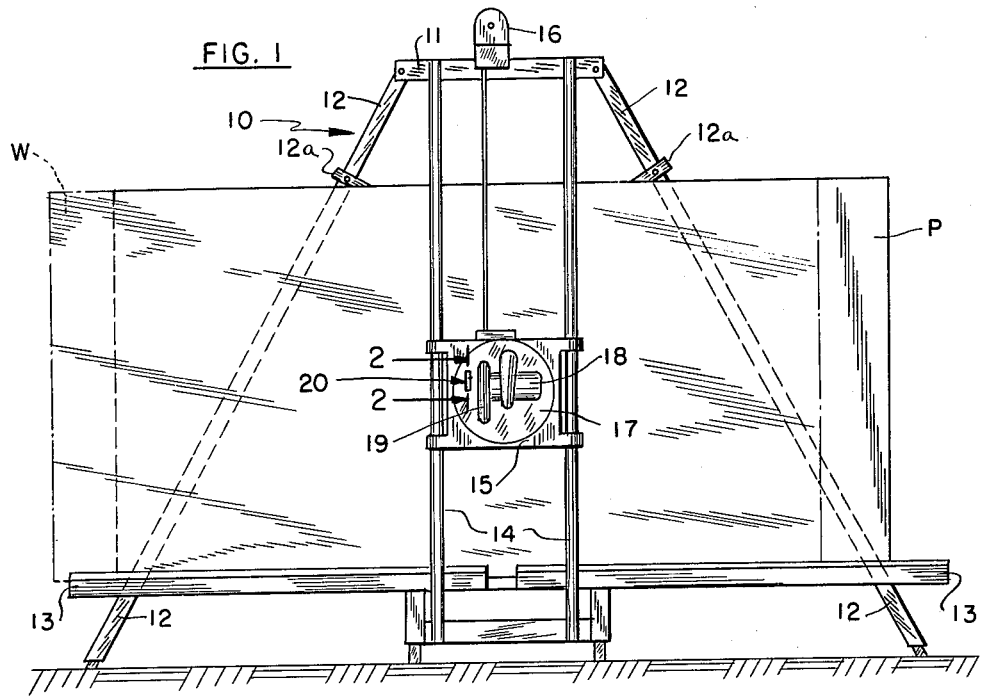
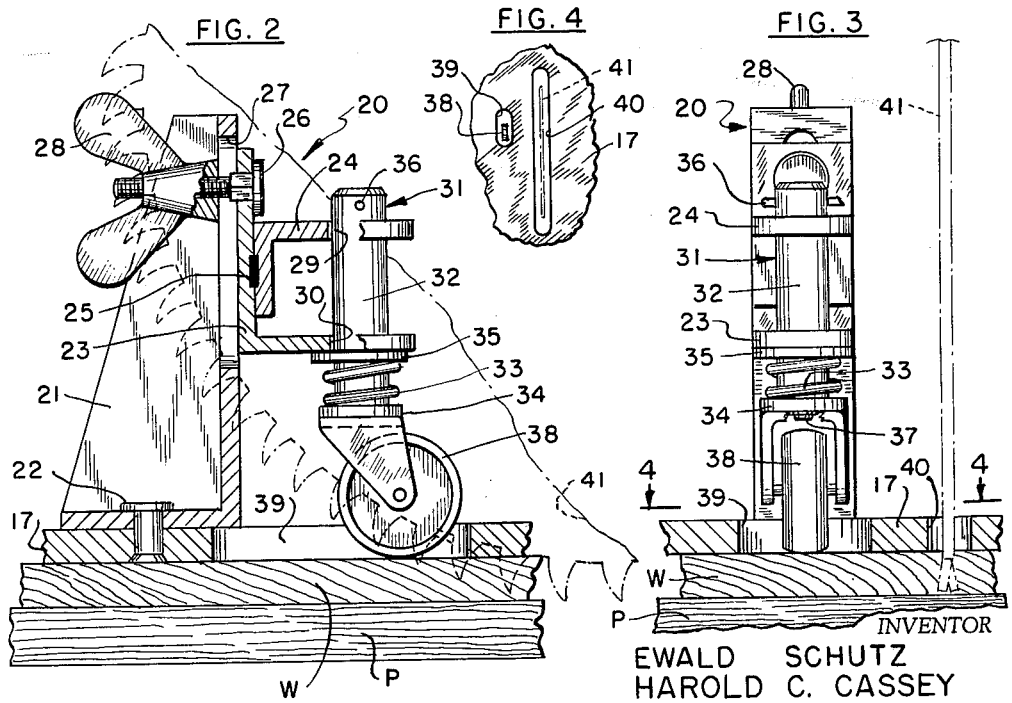

The present invention relates to a work hold-down device for a power-operated saw machine for the cutting of wide boards or panels, and more particularly, to a resiliently-mounted work hold-down device which steadies the panel and prevents it from vibrating during the cutting operation.

While not necessarily confined thereto, the present invention nevertheless finds more particular utility with regard to a vertically-disposed power-operated saw machine for the cutting of wide boards or panels which are supported upon a bottom ledge provided by the frame of the machine. Such a machine includes a saw carriage which is slidably mounted for vertical movement along a pair of rails for normal cross-cutting operations. The carriage is provided with a power-operated saw having a circular blade which extends through a slot formed in the carriage. Preferably, the carriage includes a rotatable turntable by means of which the power-operated saw may be indexed to a right-angular position, and thereafter the carriage may be locked to the rails to facilitate a ripping operation as the panel is fed through the machine.

It is an object of the present invention to provide a work hold-down device for a panel saw or other power-operated machine, which steadies the work and prevents it from vibrating, thereby enhancing the safety of the machine and facilitating the making of a smoother and more efficient cut.

In accordance with the general teachings of the present invention, there is herein illustrated and described for use in conjunction with a panel saw machine, a work hold-down device which comprises an anti-friction work-engaging element resiliently-mounted with respect to the machine for movement in a direction towards and away from the plane of the saw carriage; and the element extends through an aperture formed in the carriage to engage a surface of the panel being cut, thereby steadying the panel and preventing it from vibrating during the cutting operation.

In accordance with the more specific teachings of the present invention, there is herein illustrated and described for use in conjunction with a panel saw machine adapted for the cutting of wide boards or panels, a work hold-down device which comprises a bracket secured to the saw carriage and a support member adjustably mounted to the bracket. A hold-down member is resiliently-mounted to the support member for movement in a direction towards and away from the plane of the saw carriage; and a work-engaging anti-friction element, such as a rotatable wheel, is carried by the hold-down member and extends through a slot formed in the carriage to engage a surface of the panel being cut, thereby holding the panel firmly against the frame of the machine and preventing the panel from chattering or vibrating during the cutting operation. Preferably, the slot is in close proximity with, and substantially parallel to, the blade slot formed in the carriage, such that the panel is steadied at a critical area directly adjacent to the kerf being made in the panel.

These and other objects of the present invention will become more apparent from a reading of the following specification, taken in conjunction with the enclosed drawings, in which:

FIGURE 1 is a front elevation of one embodiment of a panel saw machine adapted for the cutting of wide boards or panels;

FIGURE 3 is an enlarged section view taken along the lines 2—2 of FIGURE 1, showing the work hold-down device of the present invention;

FIGURE 3 is a front elevation of the work hold-down device of FIGURE 2; and

FIGURE 4 is a section view taken along the lines 4—4 of FIGURE 3, reduced over the scale of FIGURE 4, and showing the slot formed in the carriage to accommodate the work-engaging element of the hold-down device.

With reference to FIGURE 1, there is illustrated a vertically-disposed panel saw machine 10 with which the teachings of the present invention may find more particular utility; however, it will be appreciated by those skilled in the art that the essence and teachings of the present invention are equally applicable to a variety of power-operated saws or other machines. With this in mind, the panel saw machine 10 comprises a frame 11 including a pair of side legs 12, a pair of work platens 13 which support the panel workpiece W as it is being cut, a backing or support panel P which may comprise a standard plywood panel secured to the frame, a pair of rails 14 secured to the frame, a carriage 15 slidably mounted for vertical movement along the rails 14, a balance reel 16 by means of which the carriage 15 is returned to the upper portion of the machine upon the completion of a cut, a rotatable turntable 17 journaled within the carriage 15, a power-operated circular saw 18 mounted upon the turntable 17 and having a conventional circular saw blade (not shown in FIGURE 1), a guard 19 for the blade, and the work hold-down device 20 of the present invention.

The overall concept of the panel saw machine 10, including the feature of the rotatable turntable 17, is described more fully in the Bennett Patent 2,833,320 issued on May 6, 1958.

With reference to FIGURES 2 and 3, the work hold-down device 20 of the present invention includes a bracket 21 secured to the turntable 17 of the carriage 15 by means of a rivet 22 or other suitable means. A support member comprising a pair of angled members or brackets 23 and 24 secured to each other, as by the weld 25, is adjustably mounted to the bracket 21 by means of a screw 26, slot 27 formed in the bracket 21, and wing nut 28. The outboard portions of the brackets 23 and 24 have aligned respective holes 29 and 30 to receive a hold-down member 31. The hold-down member 31 comprises a rod 32 which is resiliently mounted to the brackets 23 and 24 by means of a spring 33. The spring 33 is retained between the head of a swivel caster 34 and a washer 35, and the rod 32 is precluded from being ejected out of the brackets 23 and 24 by means of a pin 36 carried by the rod. The caster 34 is secured on the end of the rod 32 by means of a rivet 37. The caster 34 includes an anti-friction work-engaging element, such as the wheel 38 rotatably journaled thereon. Preferably, the wheel 38 is made of an anti-friction material, such as nylon. The wheel 38 extends through a slot 39 or other aperture formed in the turntable 17 of the carriage 15; and the wheel 38 engages a surface of the workpiece W being cut by the machine, thereby steadying the workpiece W and preventing it from chattering or vibrating during the cutting operation. The slot 39, see FIGURE 4, is preferably in close proximity with, and substantially parallel to, the blade slot 40 formed in the turntable 17 to accommodate the circular saw blade 41, so that a good firm support is provided in the critical area directly adjacent to the cut being made by the blade.

Obviously, many modifications may be made without departing from the basic spirit of the present invention;

and accordingly, within the scope of the appended claims, the invention may be practiced other than has been specifically described herein.

We claim:

In a panel saw machine for the cutting of wide boards or panels held in a substantially vertical position, the machine comprising a frame with means thereon to support the bottom edge of the workpiece, a pair of rails forming a vertical trackway on the frame, a carriage slidably mounted on the trackway, a rotatable plate in the carriage, means selectively indexing the rotatable plate in two mutually-perpendicular positions for cross-cutting or ripping operations, respectively, with the carriage being traversed on the vertical trackway and the work being stationary in the cross-cutting position, and with the carriage being locked to the trackway and the work being fed into the machine in the ripping position, with a motor on the plate, and a blade driven by the motor and extending through a blade opening in the plate to engage the work: the improvement of means to hold the workpiece against the frame of the machine, which comprises:

(a) supporting means mounted on the plate beside the blade opening;
(b) a member mounted on said supporting means for movement towards and away from the plate, and a spring means urging said member towards the plate; and
(c) a swivel caster on the end of said member and including a roller wheel extending through an opening in the plate to engage the work;
(d) said opening being disposed in close proximity to the blade opening, whereby said roller wheel prevents any chattering of the workpiece in the vicinity of the blade; and
(e) whereby said roller wheel may swivel as the rotatable plate is indexed from one of its positions to another.

References Cited by the Examiner
UNITED STATES PATENTS

| | | | |
|---|---|---|---|
| 2,125,919 | 8/38 | Harris | 144—249 |
| 2,522,789 | 9/50 | Johnson | 143—6.1 |
| 2,676,624 | 4 54 | Gecmen | 143—43 |
| 2,780,254 | 2/57 | Carpentiere | 144—249 |
| 2,817,376 | 12/57 | Johannsen | 144—249 |
| 2,833,320 | 5/58 | Bennett | 143—47 |

ROBERT C. RIORDON, *Primary Examiner.*

WILLIAM W. DYER, JR., *Examiner.*